May 7, 1935.    C. O. RUDD ET AL    2,000,647
ANT TRAP
Filed April 30, 1934
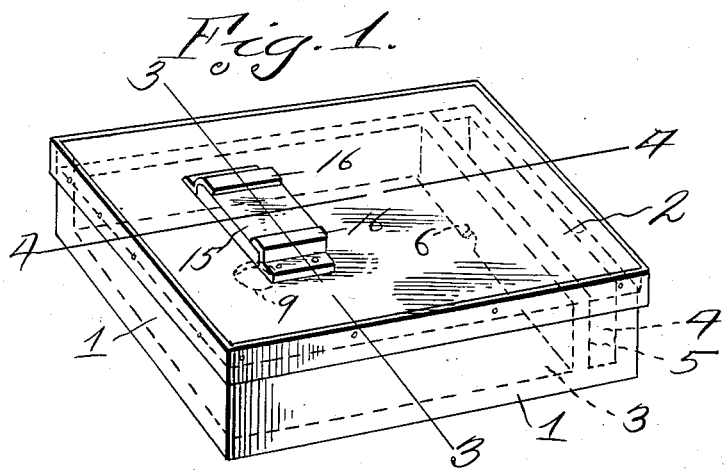
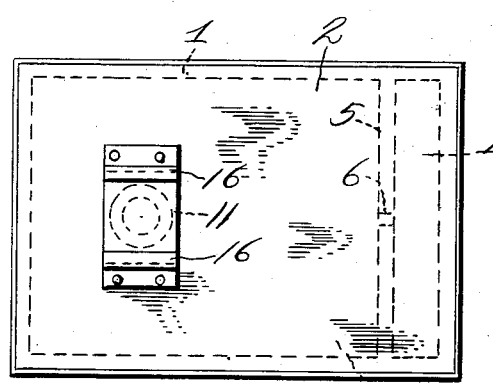
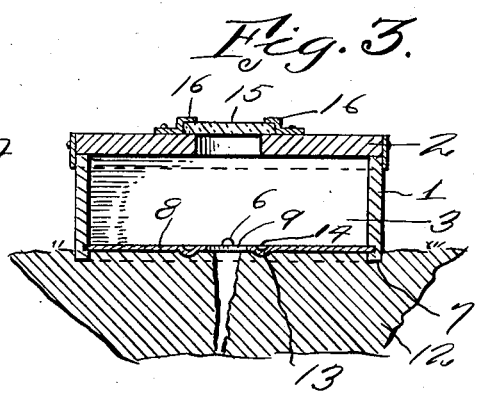
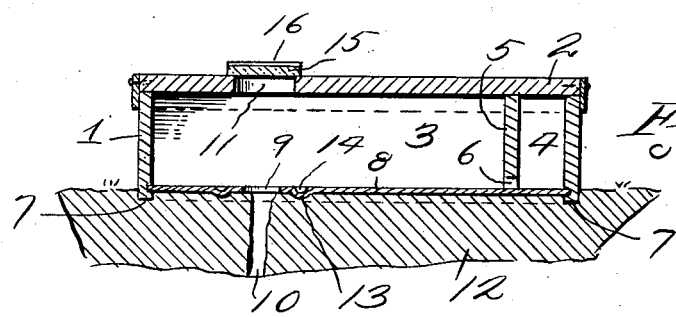
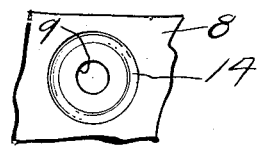
Inventors
Clayton O. Rudd &
Oscar C. Rudd
By Philip A. ——
Attorney Patented May 7, 1935

2,000,647

UNITED STATES PATENT OFFICE 2,000,647

ANT TRAP

Clayton O. Rudd and Oscar C. Rudd, Phoenix, Ariz.

Application April 30, 1934, Serial No. 723,258

2 Claims. (Cl. 43—121)

The invention relates to ant traps, and has for its object to provide a device of this character comprising a receptacle having an entrance aperture in the bottom thereof adapted to be placed in registration with an ant hole and a light admitting glass covered aperture in the top of the receptacle and positioned whereby a light will enter the ant hole through the entrance hole for attracting ants into the receptacle.

A further object is to provide one end of the receptacle chamber with an auxiliary chamber formed by a partition having an entrance and in which auxiliary chamber dead ants are stored when dragged from the ant hole and nest by the live ants.

A further object is to provide means whereby poison may be placed around the entrance hole and through which ants will have to pass when entering the chamber of the receptacle.

A further object is to provide a channel around the entrance aperture in the bottom of the receptacle for the reception of poison, liquid or powder and through which the ants pass in entering the chamber of the receptacle or returning to the ant hole from the chamber, thereby carrying the poison into the nest.

A further object is to provide an ant trap comprising a receptacle having an entrance aperture in the bottom thereof and a light aperture positioned whereby light rays will pass through the entrance aperture into the ant hole.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the trap.

Figure 2 is a top plan view of the trap.

Figure 3 is a vertical transverse sectional view taken on line 3—3 of Figure 1.

Figure 4 is a vertical longitudinal sectional view taken on line 4—4 of Figure 1.

Figure 5 is a top plan view of a portion of the bottom of the receptacle, showing the entrance aperture and the poison receiving channel around the aperture.

Referring to the drawing, the numeral 1 designates the body of the receptacle which is provided with a removable cover 2, and which body is provided with a main compartment 3 and an auxiliary compartment 4. The main compartment 3, adjacent one end thereof is provided with a transverse partition 5, which forms the auxiliary compartment, 4 and through which partition an ant entrance 6 is provided to the auxiliary compartment 4. Disposed within the body 1 and spaced upwardly from the lower edge 7 thereof is a bottom 8, which has an ant entrance 9, which, when the device is positioned over the nest entrance 10, registers therewith, so that ants passing from the nest will enter the compartment 3 of the trap. To attract ants to the compartment 3 the removable cover 2 is provided with a light admitting aperture 11 on the vertical axis of the entrance 9 and ant passage 10. By positioning the light aperture 11 on the axis of the entrance 9 and ant passage 10, and forming the aperture 11 larger than the entrance 9, light will enter the nest passage 10 and attract the ants to the chamber 3. By spacing the bottom 8 upwardly, from the lower edge 7 as clearly shown in Figure 4, it will be seen that the lower edges 7 of the body will be imbedded in the ground 12, forming a seal between the ground and the body of the trap, with the ground surrounding the entrance aperture 9 in engagement with the bottom 8, thereby preventing the ants from taking a lateral course under the bottom of the trap. A seal is further formed with the ground around the nest entrance 10 by the struck down bead 13 surrounding the entrance aperture 9 and forming a poison receiving channel 14 in which liquid or powdered poison may be placed and through which the ants will pass.

Poison in a powder or liquid form is placed in the channel 14 and ants entering or leaving the nest will pass through the poison and carry the same eventually into the nest on their bodies. It will be noted by providing the channel 14 for the reception of the poison, the ants in passing through the same will not drag a passage through the poison, through which other ants could pass without accumulating powder on their bodies, as it is obvious they could not drag the powder out of the channel. As ants die in a nest, live ants drag the dead ones out or store the same in a separate chamber and the chamber 4, the auxiliary chamber of the device, is provided for this purpose. The ants will drag the dead into the chamber 3, across the poison and then through the partition entrance 6 for storage purposes in the auxiliary chamber 4, therefore it will be seen that the live ants will collect poison on their bodies when they leave the nest and when they re-enter, consequently carrying poison into the nest on their bodies for killing other ants as well as themselves.

The light aperture 11 is provided with a transparent cover 15, which may be removably held in position by means of angle members 16 carried by the cover 2.

From the above it will be seen that an ant trap is provided which is simple in construction, parts reduced to a minimum, and one wherein an auxiliary chamber is provided, in which the ants may store their dead and positioned whereby live ants passing to the same and returning to the nest will pass through a poison and carry the poison back to the nest.

The invention having been set forth what is claimed as new and useful is:

1. The combination with an ant trap comprising a receptacle having a main chamber and an auxiliary chamber with a passage of communication between said chamber and through which dead ants are dragged by live ants from an entrance passage to the main chamber, said entrance passage being in the bottom of the main chamber and adapted to register with the passage of an ant nest, of a poison receiving groove in the bottom of the receptacle and surrounding the entrance thereto and positioned whereby ants passing into the main chamber of the passage thereof and to the auxiliary chamber and vice versa will be compelled to cross said poison receiving groove surrounding the entrance passage to the main chamber.

2. A device as set forth in claim 1 wherein the bottom of the receptacle is provided with a downwardly extending bead around the entrance passage to the main chamber, said bead also forming the poison receiving groove around the passage within the main chamber.

CLAYTON O. RUDD.
OSCAR C. RUDD.